(12) United States Patent
Kinjo et al.

(10) Patent No.: US 11,783,377 B2
(45) Date of Patent: Oct. 10, 2023

(54) COMMUNICATION SYSTEM, COMMUNICATION APPARATUS, COMMUNICATION METHOD, PROGRAM AND ADVERTISEMENT COMMUNICATION SYSTEM

(71) Applicant: NIPPON TELEGRAPH AND TELEPHONE CORPORATION, Tokyo (JP)

(72) Inventors: Koha Kinjo, Tokyo (JP); Tetsuya Okuda, Tokyo (JP); Yuki Okano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/282,982

(22) PCT Filed: Oct. 11, 2019

(86) PCT No.: PCT/JP2019/040188
§ 371 (c)(1),
(2) Date: Apr. 5, 2021

(87) PCT Pub. No.: WO2020/095620
PCT Pub. Date: May 14, 2020

(65) Prior Publication Data
US 2021/0342895 A1 Nov. 4, 2021

(30) Foreign Application Priority Data
Nov. 7, 2018 (JP) ................... 2018-209834

(51) Int. Cl.
*G06Q 30/00* (2023.01)
*G06Q 30/0273* (2023.01)
*G06Q 20/38* (2012.01)
*H04L 9/32* (2006.01)
*G06Q 30/0241* (2023.01)

(52) U.S. Cl.
CPC ... *G06Q 30/0275* (2013.01); *G06Q 20/38215* (2013.01); *H04L 9/3268* (2013.01); *G06Q 30/0248* (2013.01)

(58) Field of Classification Search
CPC .......... G06Q 30/0275; G06Q 20/38215; H04L 9/3268
See application file for complete search history.

(56) References Cited

U.S. PATENT DOCUMENTS

| 7,509,498 B2 * | 3/2009 | Brickell ................ H04L 9/3247 713/157 |
| 2012/0167233 A1 * | 6/2012 | Gillum .................. H04L 51/212 709/206 |

(Continued)

FOREIGN PATENT DOCUMENTS

JP 2017-220769 A 12/2017

OTHER PUBLICATIONS

Chen, C., Mitchell, C. J., & Tang, S. (2011). SSL/TLS session-aware user authentication using a GAA bootstrapped key doi:http://dx.doi.org/10.1007/978-3-642-21040-2_4 (Year: 2011).*

(Continued)

*Primary Examiner* — Matthew L Hamilton

(57) ABSTRACT

A communication system includes a transmitting device configured to transmit information, and a receiving device configured to receive the information, the receiving device includes a determination unit configured to determine whether or not an electronic certificate of the transmitting device used for a communication with the transmitting device is an EV certificate, and a process that is performed is varied according to a determination result of the determination unit.

20 Claims, 7 Drawing Sheets

(56) References Cited

U.S. PATENT DOCUMENTS

| | | | |
|---|---|---|---|
| 2014/0180835 A1* | 6/2014 | Bitran | G06F 21/6209 |
| | | | 705/14.73 |
| 2015/0074390 A1* | 3/2015 | Stoback | H04L 63/1483 |
| | | | 713/156 |
| 2016/0379275 A1* | 12/2016 | Alicherry | G06Q 30/0275 |
| | | | 705/14.71 |
| 2017/0032413 A1* | 2/2017 | McCartney | G06Q 30/0275 |
| 2017/0053307 A1* | 2/2017 | Schler | G06Q 30/0277 |
| 2017/0236165 A1* | 8/2017 | Schler | G06Q 30/0275 |
| | | | 705/14.71 |
| 2019/0378162 A1* | 12/2019 | Goldberg | G06Q 30/0242 |
| 2021/0344712 A1* | 11/2021 | Maxwell | H04L 9/0894 |

OTHER PUBLICATIONS

Alqaydi, L., Yeun, C. Y., & Damiani, E. (2017). Security enhancements to TLS for improved national control (Year: 2017).*

IAB Tech Lab., "OpenRTB API Specification Version 2.5", [online], [searched Oct. 15, 2018], Internet <https://www.iab.com/wp-content/uploads/2016/03/OpenRTB-API-Specification-Version-2-5-FINAL.pdf>.

IAB Tech Lab., "OpenRTB 3.0 Framework", [online], [searched Oct. 15, 2018], Internet <https://iabtechlab.com/wp-content/uploads/2017/09/OpenRTB-3.0-Draft-Framework-for-Public-Comment.pdf>.

Mechanisms and Features of PMPs, [online], [searched Oct. 15, 2018], Internet <https://dmlab.jp/adtech/pmp.html>.

* cited by examiner

COMMUNICATION SYSTEM, COMMUNICATION APPARATUS, COMMUNICATION METHOD, PROGRAM AND ADVERTISEMENT COMMUNICATION SYSTEM

CROSS-REFERENCE TO RELATED APPLICATIONS

This application is a U.S. 371 Application of International Patent Application No. PCT/JP2019/040188, filed on 11 Oct. 2019, which application claims priority to and the benefit of JP Application No. 2018-209834, filed on 7 Nov. 2018, the disclosures of which are hereby incorporated herein by reference in their entireties.

TECHNICAL FIELD

The present invention relates to communication systems, communication apparatuses, communication methods, programs, and advertisement communication systems.

BACKGROUND ART

Services that mediate the supply and demand of contents are popular on the Internet. As an example, the ad network, which is a platform for Internet advertising, has attracted attention in recent years. The ad network enables efficient advertising transactions by adopting a mechanism for enabling the advertiser and the media to automatically submit bids via their respective agents (for example, refer to Non-Patent Document 1).

Furthermore, in the automatic bidding mechanism described above, a mechanism for authenticating the advertiser and the media has been studied as an upgrade of the Non-Patent Document 1 (for example, refer to Non-Patent Document 2).

PRIOR ART DOCUMENTS

Non-Patent Documents

Non-Patent Document 1: IAB Tech Lab., "OpenRTB API Specification Version 2.5", [online], [searched Oct. 15, 2018], Internet <https://www.iab.com/wp-content/uploads/2016/03/OpenRTB-API-Specification-Version-2-5-FINAL.pdf>
Non-Patent Document 2: IAB Tech Lab., "OpenRTB 3.0 Framework", [online], [searched Oct. 15, 2018], Internet <https://iabtechlab.com/wp-content/uploads/2017/09/OpenRTB-3.0-Draft-Framework-for-Public-Comment.pdf>
Non-Patent Document 3: Mechanisms and Features of PMPs, [online], [searched Oct. 15, 2018], Internet <https://dmlab.jp/adtech/pmp.html>

DISCLOSURE OF THE INVENTION

Problem to be Solved by the Invention

The ad network includes vendors specialized in their respective roles, between the advertisers and the media, thereby providing efficient advertisement communication. In particular, a Demand Side Platform (DSP) which is an advertising agent, and a Supply Side Platform (SSP) which is a media agent, respectively optimize the advertising placement and the media advertisement.

In the following description, the DSP, and various agents which perform advertising management and the like on behalf of the advertisers, are generally referred to as "advertisers". In addition, the SSP, various agents which perform advertising spot management and the like on behalf of the media, and advertising bidding platforms such as Ad Exchange and the like, are generally referred to as "intermediaries". The media, and user terminals communicating through the media, are generally referred to as "publishers". Further, the advertisers, intermediaries, and the publishers will be referred to as "operators", when the advertisers, intermediaries, and the publishers are not distinguished from one another.

The automatic bidding mechanism described above is a communication performed among the advertisers, the intermediaries, and the publishers, and adopts authentication of the media of end-point communication and the DSP.

However, if the publisher or the advertiser itself is a fraudulent operator, this authentication mechanism will not function. In the following, an operator, the existence of which cannot be confirmed (accountability untraceable), will be referred to as a "fraudulent operator". In an example of the publisher which is a fraudulent operator, the advertisement uses bot click (Ad Fraud). In an example of the advertiser which is a fraudulent operator, a fraudulent advertisement is distributed and placed in the media (maladvertising).

A whitelist advertising platform called Private Market Place (PMP) is provided as a countermeasure against fraudulent operators in the ad network (for example, refer to Non-Patent Document 3).

However, there are problems associated with the PMP advertising platforms, such as the need to build the white list, the market that is restricted by the restriction of the white list, and the like.

On the other hand, an encrypted communication via Secure Socket Layer (SSL) is becoming popular as the communication at a Web site, and is beginning to penetrate the advertising industry. Digital certificates used in the SSL communication include Domain Validation (DV) certificates, Organization Validation (OV) certificates, and Extended Validation (EV) certificates.

Because the DV certificate is a domain authentication, an organization validation is not performed, and fraudulent instances taking advantage of this have also occurred in the advertising industry. Malvertizing, in which the operator possessing the DV certificate embeds a malware in the advertisement, has also been confirmed.

On the other hand, because the OV certificate is issued after review of information related to the organization, the OV certificate verifies that the site operator is correct. In addition, the EV certificate further verifies that the legitimacy and physical existence of the operator.

However, on the Web browser, the EV certificate is merely utilized to display an address bar in a green color for a Web site using the EV certificate. The terminal installed with the Web browser does not perform, by itself, a special process (for example, restricting access to the Web site, and the like) depending on whether or not the certificate of the Web site is the EV certificate.

In the description given above, an example of the communication related to the advertising transactions is described as an example. However, exclusion of a fraudulent entity at the end of the communication is also required in agent-to-agent communication (communication between devices) in Artificial Intelligence (AI), Internet of Things (IoT), and the like.

The present invention was conceived in view of the points described above, and one object of the present invention is to enable detection of an entity at the end of the communication and having a validity that is not verified.

Means of Solving the Problem

In order to solve the problem described above, a communication system includes a transmitting device configured to transmit information, and a receiving device configured to receive the information, the receiving device includes a determination unit configured to determine whether or not an electronic certificate of the transmitting device used for a communication with the transmitting device is an EV certificate, and a process that is performed is varied according to a determination result of the determination unit.

Effects of the Invention

It is possible to enable detection of an entity at the end of the communication and having a validity that is not verified.

MODE OF CARRYING OUT THE INVENTION

Figure 1:
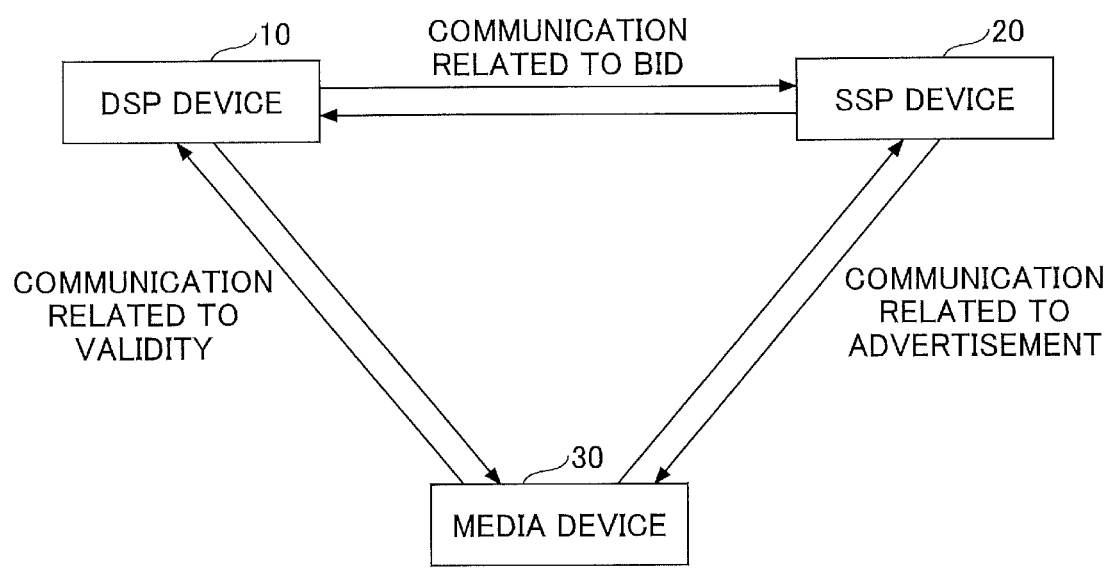
FIG. 1 is a diagram illustrating an example of a functional configuration of an advertisement communication system according to a first embodiment.

Hereinafter, embodiments of the present invention will be described with reference to the drawings. FIG. 1 is a diagram illustrating an example of a functional configuration of an advertisement communication system according to a first embodiment. As illustrated in FIG. 1, an advertisement communication system 1 includes a DSP device 10, an SSP device 20, a media device 30, and the like. Each of the DSP device 10, the SSP device 20, and the media device 30 is connected to each other via one or more networks to perform two-way communication. Such a two-way communication is authenticated by the public key infrastructure and the like, and is performed by the Secure Socket Layer (SSL). The advertisement communication system 1 according to this embodiment is a system which anticipates application particularly to the ad network.

The DSP device 10 is formed by one or more computers functioning as an agent (publicity agent) for a plurality of advertisers in an ad network. More particularly, the DSP device 10 functions as a Demand Side Platform (DSP) of a Real Time Bidding (RTB) in the ad network. In other words, with respect to an advertising spot of a media (Web site and the like) accessed by a user terminal, the DSP device 10 performs an in-DSP auction of an advertising creative (advertising material) to be placed in the advertising spot, in response to a bid request transmitted from the SSP device 20, and transmits a result of the in-DSP auction to the SSP device 20. In this state, the DSP device 10 communicates with the media device 30, in order to confirm the validity of the media device 30. The user terminal refers to a terminal which is utilized by a user to browse the media (Web site and the like), such as a smartphone, a tablet terminal, a Personal Computer (PC), and the like.

The SSP device 20 is formed by one or more computers functioning as an agent (media agent) for a plurality of media in the ad network. More particularly, the SSP device 20 functions as a Supply Side Platform (SSP) of the Real Time Bidding (RTB) in the ad network. In other words, in response to a (successful bid) request for the advertising spot from the media accessed by the user terminal, the SSP device 20 requests bidding for the advertising spot owned by the media device 30 to each DSP device 10, and performs an auction with winners of the auction in each DSP device 10, to notify an advertisement tag of the awarded advertising creative to the media device 30.

The media device 30 is formed by one or more computers providing a media (Web site and the like) having an advertising spot, with respect to the user. Hereinafter, for the sake of convenience, the media device 30 may not only include the media but also the user terminal. Among the communications performed by the media device 30, the communication with the SSP device 20 may be performed by the user terminal, and the communication with the DSP device 10 may be performed by the media.

The advertisement communication system 1 according to the first embodiment is a system utilizing an Extended Validation (EV) certificate verification mechanism based on Open RTB 3.0. Because implementation of a signature function in the Open RTB 3.0 is expected, tampering by the SSP device 20 is not possible. The SSP device 20 does not have an EV certificate, in accordance with the configuration which regards the SSP device 20 as being unreliable.

Further, in FIG. 1, each of the DSP device 10, the SSP device 20, and the media device 30 is illustrated by a single rectangular box, however, the multiplicity of the relationships among the devices is many-to-many.

Figure 2:
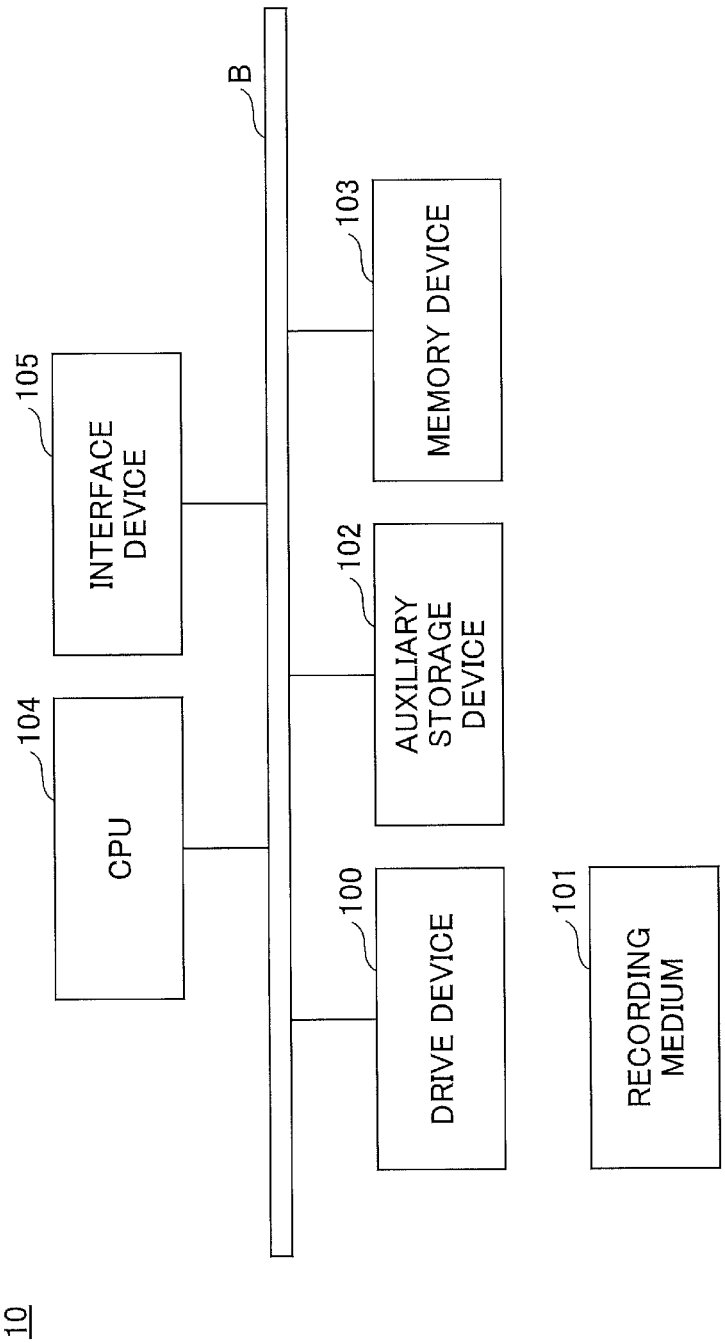
FIG. 2 is a diagram illustrating an example of a hardware configuration of a DSP device 10 according to the first embodiment.

FIG. 2 is a diagram illustrating an example of a hardware configuration of the DSP device 10 according to the first embodiment. The DSP device 10 of FIG. 2 includes a drive device 100, an auxiliary storage device 102, a memory device 103, a CPU 104, an interface device 105, and the like which are connected to each other via a bus B.

A program for implementing the process by the DSP device 10 is provided by a recording medium 101, such as a CD-ROM and the like. When the recording medium 101 which stores the program is set to the drive device 100, the program is installed from the recording medium 101 to the auxiliary storage device 102 via the drive device 100. However, the installing of the program need not necessarily be performed using the recording medium 101, and the program may be downloaded from another computer via a network. The auxiliary storage device 102 stores the installed program, as well as necessary files, data, and the like.

The memory device 103 reads out and stores the program from the auxiliary storage device 102 when an instruction to start the program is issued. The CPU 104 implements functions associated with the DSP device 10 according to the program stored in the memory device 103. The interface device 105 is used as an interface for connecting to the network.

The SSP device 20 and the media device 30 may also be formed by one or more computers illustrated in FIG. 2.

Figure 3:
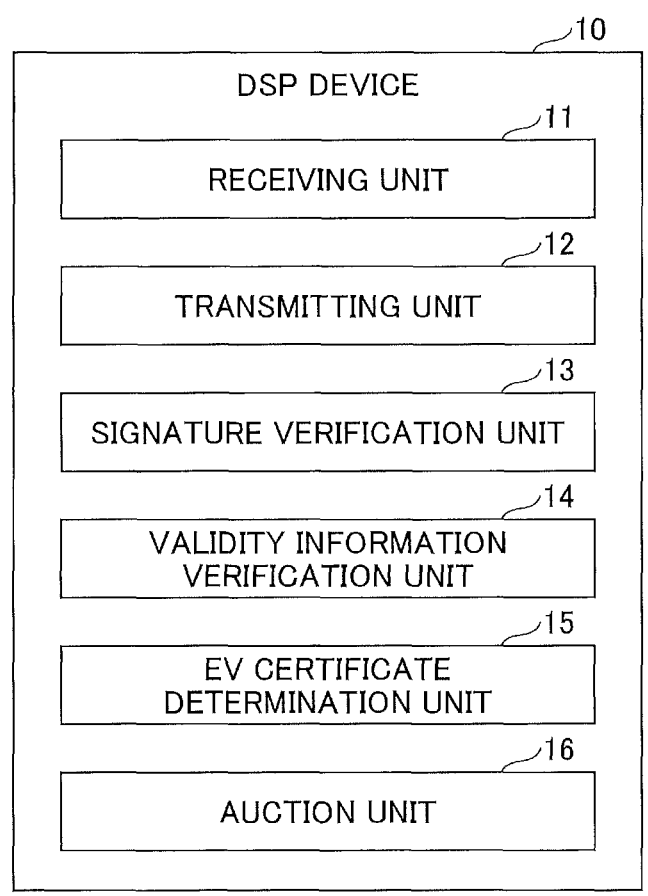
FIG. 3 is a diagram illustrating an example of a functional configuration of the DSP device 10 according to the first embodiment.

FIG. 3 is a diagram illustrating an example of a functional configuration of the DSP device 10 according to the first embodiment. In FIG. 3, the DSP device 10 includes a receiving unit 11, a transmitting unit 12, a signature verification unit 13, a validity information verification unit 14, an EV certificate determination unit 15, and an auction unit 16. One or more programs installed in the DSP device 10 cause the CPU 104 to execute a process of each of these units.

The receiving unit 11 receives a bid request (bidding request) transmitted from the SSP device 20, information transmitted (validity information which will be described later) from the media device 30, and the like. The transmitting unit 12 transmits information related to the bid (a result of an in-DSP auction, and the like) to the SSP device 20, and transmits information related to the validity of the media (hereinafter referred to as "validity information") to the media device 30. The signature verification unit 13 determines the presence or absence of tampering based on signature verification, with respect to the bid request (bidding request for an advertising spot) received from the SSP device 20. The validity information verification unit 14 verifies the presence or absence of an error, with respect to the validity information returned from the media device 30 in response to a transmission request for the validity information of the media. The EV certificate determination unit 15 determines whether or not an electronic certificate (hereinafter simply referred to as a "certificate") of the media (the media device 30) obtained by the SSL communication with the media device 30 is an EV certificate. In response to the bid request from the SSP device 20, the auction unit 16 performs the in-DSP auction of the advertising creative (advertising material) of a plurality of advertisers, based on the information possessed in advance, whether or not the certificate of the media (media device 30) is the EV certificate, and the like.

Figure 4:
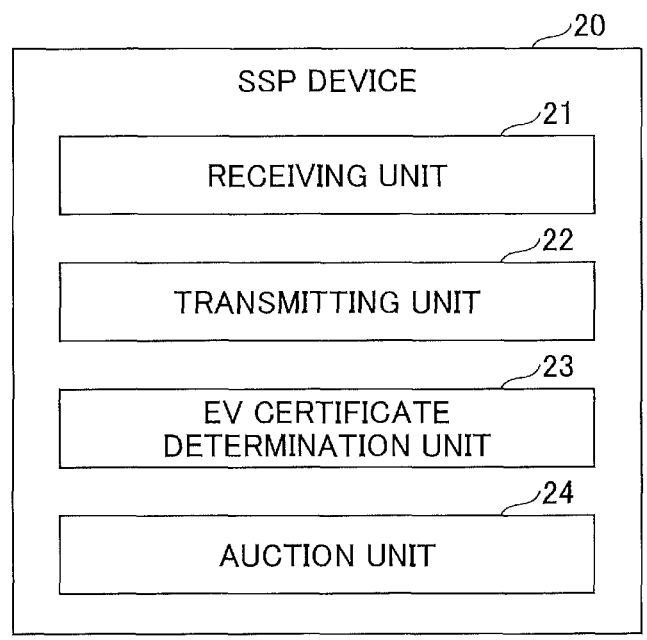
FIG. 4 is a diagram illustrating an example of the functional configuration of an SSP device 20 according to the first embodiment.

FIG. 4 is a diagram illustrating an example of a functional configuration of the SSP device 20 according to the first embodiment. In FIG. 4, the SSP device 20 includes a receiving unit 21, a transmitting unit 22, an EV certificate determination unit 23, and an auction unit 24. One or more programs installed in the SSP device 20 cause a CPU of the SSP device 20 to execute a process of each of these units.

The receiving unit 21 receives a response from the DSP device 10 with respect to the bid request, and an advertising request from the media device 30. The transmitting unit 22 transmits the bid request to the DSP device 10, and transmits information related to the awarded advertisement to the media device 30. The EV certificate determination unit 23 determines whether or not the certificate of the DSP device 10 in the SSL communication with the DSP device 10 is the EV certificate. Based on the information possessed in advance, the results of the auctions in the DSP received from each DSP device 10, whether or not the certificate of the DSP device 10 is the EV certificate, and the like, the auction unit 24 performs an auction of the advertising creative of the winners of the auctions in each DSP device 10, in response to the advertising request from the media device 30.

Figure 5:
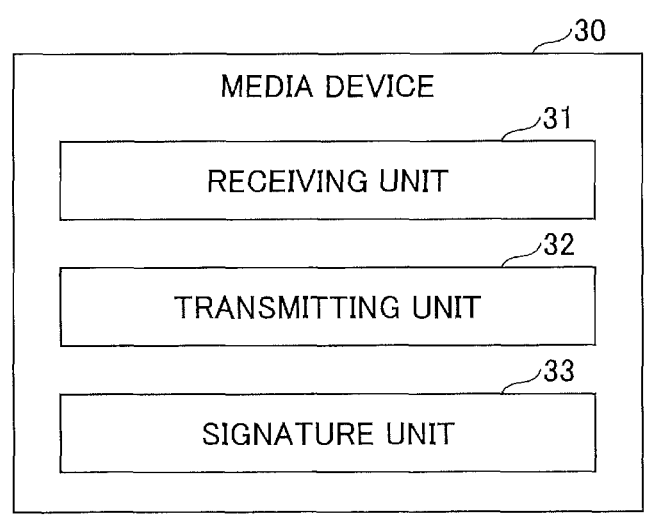
FIG. 5 is a diagram illustrating an example of a functional configuration of a media device 30 according to the first embodiment.

FIG. 5 is a diagram illustrating an example of a functional configuration of the media device 30 according to the first embodiment. In FIG. 5, the media device 30 includes a receiving unit 31, a transmitting unit 32, and a signature unit 33. One or more programs installed in the media device 30 cause a CPU of the media device 30 to execute a process of each of these units.

The receiving unit 31 receives the transmission request for the validity information of the media, transmitted from the DSP device 10, and the information related to the awarded advertisement, transmitted from the SSP device 20. The transmitting unit 32 transmits the advertising request to the SSP device 20, and transmits the validity information of the media to the DSP device 10. The signature unit 33 attaches a digital signature to the information to be included in the advertising request.

Figure 6:
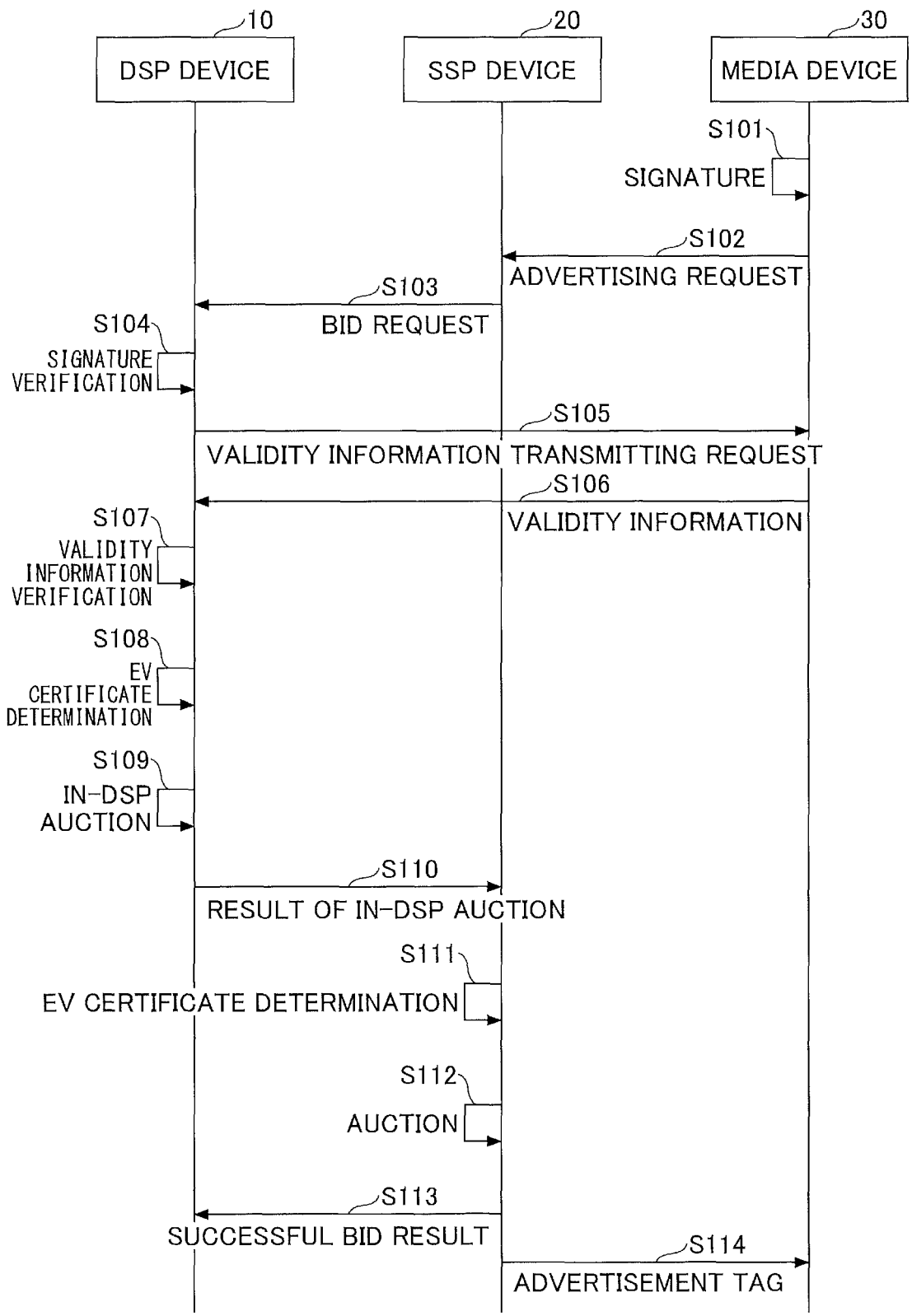
FIG. 6 is a sequence diagram for explaining an example of a processing procedure performed in the advertisement communication system according to the first embodiment.

Hereinafter, a processing procedure performed in the advertisement communication system 1 according to the first embodiment will be described. FIG. 6 is a sequence diagram for explaining an example of the processing procedure performed by the advertisement communication system according to the first embodiment. FIG. 6 illustrates an example in which steps S101 through S114 are performed, but it is assumed that the communication for the authentication is already performed separately. In addition, steps S101 through S114 are based on the communication adopted in the known automatic bidding mechanism (RTB) for the advertising transactions. In the first embodiment, the processing for eliminating an illegal carrier is performed in accordance with the communication procedure.

In step S101, the signature unit 33 of the media device 30 associated with the media accessed from the user terminal attaches a digital signature to advertising information (media domain, IP address, advertising content information, advertiser industry, and the like). For example, the digital signature may be attached using ads.cert (https://iabtechlab.com/wp-content/uploads/2017/09/OpenRTB-3.0-Draft-Signed-Requests-RFC.pdf). The media domain refers a domain name of the media accessed from the user terminal. The IP address refers to an IP address of the media. The advertising content information refers to information indicating an advertising that is preferable for the advertising spot of the media, and the like. The advertiser industry refers to information indicating an industry that is preferable for the advertising spot of the media.

Next, the transmitting unit 32 of the media device 30 transmits an advertising request, including the advertising information with the attached digital signature, to the SSP device 20 (S102). The receiving unit 21 of the SSP device 20 receives the advertising request.

Next, the transmitting unit 22 of the SSP device 20 transmits a bid request for the media associated with the advertising request to a plurality of DSP devices 10 (S103). The bid request includes the advertising information included in the advertising request. The receiving unit 11 of each DSP device 10 receives the bid request.

Next, the signature verification unit 13 of each DSP device 10 determines the presence or absence of tampering of the advertising information, by verifying the signature attached to the advertising information included in the bid request (S104). If the signature verification result is true (if the bid request has not been tampered), the process advances to step S105. If the signature verification result is false (if the bid request has been tampered), the signature verification unit 13 rejects the bid request. In this case, step S105 and subsequent steps are not performed.

In step S105, the transmitting unit 12 of each DSP device 10 transmits a transmission request for the validity information to the media device 30. The receiving unit 31 of the media device 30 receives the request for the validity information.

Next, in response to the request for the validity information, the transmitting unit 32 of the media device 30 transmits the validity information (for example, ads.txt (https://iabtechlab.com/ads-txt/)), including information of the SSP and the media prepared in advance, to the DSP device 10 (S106). The receiving unit 11 of each DSP device 10 receives the validity information.

Next, the validity information verification unit 14 of each DSP device 10 verifies the validity of the media, based on the validity information (S107). The validity of the media may be verified according to the verification method using the ads.txt. If the validity of the media cannot be verified, step S108 and subsequent steps are not performed. If the validity of the media is verified, the EV certificate determination unit 15 of the DSP device 10 determines whether or not the certificate of the media device 30 in the SSL communication of step S106 is the EV certificate (S108). Whether or not the certificate is the EV certificate may be determined based on an Object IDentifier (OID) included in a certificate policy extension field of the certificate, for example.

Next, the auction unit 16 of each DSP device 10 performs an in-DSP auction in response to the bid request received in step S103, based on the determination result in step S108, and determines the advertising creative and a bid amount of the winner of the auction (S109). In this state, if the determination result in step S108 indicates that the certificate is not the EV certificate, the auction unit 16 may reduce the bid amount of the winner of the auction. By reducing the bid amount in this manner, it is possible to reduce the possibility of the winner being ultimately awarded the advertising spot in the auction performed in the SSP device 20. In other words, it is possible to reduce the possibility of the advertising creative of the winner being placed in a media the existence of which is not assured. Alternatively, if the determination result in step S108 indicates that the certificate is not the EV certificate, the auction unit 16 may reject the bid request received in step S103, and not perform the in-DSP auction. In this case, the winner and the like of the in-DSP auction is not determined.

The in-DSP auction may be performed using a function (Weinan Zhang, Shuai Yuan, and Jun Wang, "Optimal Real-Time Bidding for Display Advertising", 20th ACM SIGKDD Conference on Knowledge Discovery and Data Mining, (2014)), for example.

Next, the transmitting unit 12 of each DSP device 10 transmits a result of the in-DSP auction obtained in step S109 (information indicating the advertising creative and the bid amount of the winner in the in-DSP auction, and the like, or information indicating the rejection of the bid request, and the like) to the SSP device 20, as a response with respect to the bid request (S110). The receiving unit 21 of the SSP device 20 receives the result of the in-DSP auction.

Next, the EV certificate determination unit 23 of the SSP device 20 determines whether or not the certificate of each DSP device 10 in the SSL communication (response with respect to the bid request) of step S110 is the EV certificate (S111). In other words, whether or not the certificate of the DSP device 10 is the EV certificate is determined for each DSP device 10.

Next, the auction unit 24 of the SSP device 20 performs an auction of the advertising creative of the winners in each DSP, based on valid DSP auction results among the in-DSP auction results received in step S110, and the determination result in step S111, and determines an auction winner (S112). The valid in-DSP auction results refer to the results of the in-DSP auctions, including information indicating the advertising creative and the bid amount of the winners in the in-DSP auctions. The auction in step S112 may be performed using an algorithm (A. Mukherjee, R. P. Sundaraj, and K. Dutta, "An Online Algorithm for Programmatic Advertisement Placement in Supply Side Platform of Mobile Advertisement", Pacific Asia Conference on Information Systems, (2015)), for example. However, in this embodiment, an evaluation rating of the DSP device 10 which indicates that the determination result in step S111 indicates that the certificate is not the EV certificate, is lowered. In other words, the possibility of the winner of the in-DSP auction in the DSP device 10, which indicates that the certificate is not the EV certificate, being awarded, is lowered. For example, the bid amount of the winner may be reduced to one-half, or the winner may be excluded from the auction. By taking such measures, it is possible to reduce the possibility of the advertising creative of the advertiser associated with the DSP device 10 the existence of which is not assured, being awarded.

Next, the transmitting unit 22 of the SSP device 20 transmits a result (successful bid result) of the auction in step S112 to each DSP device 10 (S113). The receiving unit 11 of each DSP device 10 receives the successful bid result. The successful bid result includes information indicating the advertising creative and the bidding amount of the winner of the auction.

Next, the transmitting unit 22 of the SSP device 20 transmits an advertisement tag of the advertising creative awarded in the auction in step S112 to the media device 30 (S114). The receiving unit 31 of the media device 30 receives the advertisement tag.

As described above, according to the first embodiment, the DSP device 10 determines whether the certificate of the media device 30 is the EV certificate, thereby enabling detection of an entity (media device 30) at the end of the communication and having a validity that is not verified. Similarly, the SSP device 20 determines whether or not the certificate of the DSP device 10 is the EV certificate, thereby enabling detection of an entity (DSP device 10) at the end of the communication and having a validity that is not verified.

As a result, in a participant operator of the ad network (with signature verification) adopting the mechanism of the Non-Patent Document 2, it is possible to perform a bid control by the communication which includes a validity evaluation of existence based on the possession of the EV certificate.

Particularly, by adopting the policy which rejects the bid if the certificate is not the EV certificate in step S109 and step S112, it is possible to exclude fraudulent DSPs and fraudulent media without restricting the market.

Next, a second embodiment will be described. In the second embodiment, features that differ from those of the first embodiment will be described. The features of the second embodiment may be the same as those of the first embodiment unless specifically indicated otherwise. The advertisement communication system 1 according to the second embodiment is a system utilizing an EV certificate verification mechanism based on Open RTB 2.5. Because the Open RTB 2.5 does not include a signature function, data tampering by the SSP device 20 is possible. Accordingly, the SSP device 20 includes the EV certificate.

Figure 7:
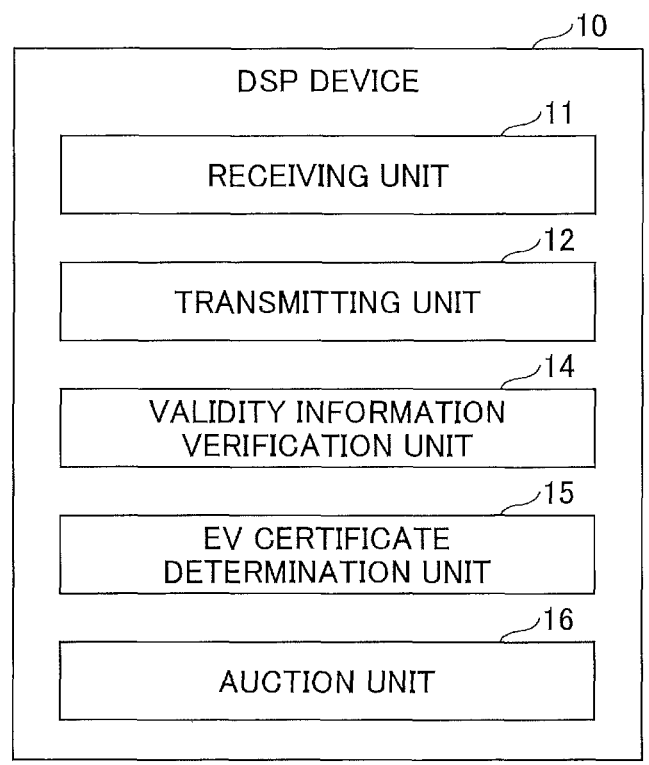
FIG. 7 is a diagram illustrating an example of the functional configuration of the DSP device 10 according to a second embodiment.

FIG. 7 is a diagram illustrating an example of the functional configuration of the DSP device 10 according to the second embodiment. In FIG. 7, the same or corresponding parts as in FIG. 3 are designated by the same reference numerals, and a description thereof will be omitted, as appropriate.

As illustrated in FIG. 7, the DSP device 10 of the second embodiment does not include a signature verification unit 13. In addition, the EV certificate determination unit 15 determines whether or not the certificate of the SSP device 20 obtained by the communication with the SSP device 20 is the EV certificate, in addition to determining whether or not the certificate of the media device 30 obtained by the communication with the media device 30 is the EV certificate.

Figure 8:
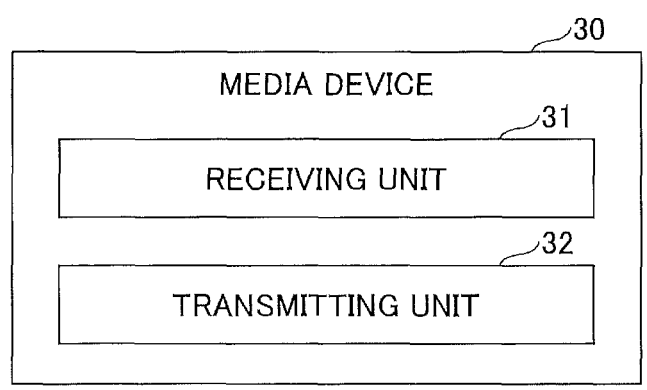
FIG. 8 is a diagram illustrating an example of the functional configuration of the media device 30 according to the second embodiment.

FIG. 8 is a diagram illustrating an example of the functional configuration of the media device 30 according to the second embodiment. In FIG. 8, the same or corresponding parts as in FIG. 5 are designated by the same reference numerals, and a description thereof will be omitted, as appropriate. As illustrated in FIG. 8, the media device 30 of the second embodiment does not include a signature unit 33.

Figure 9:
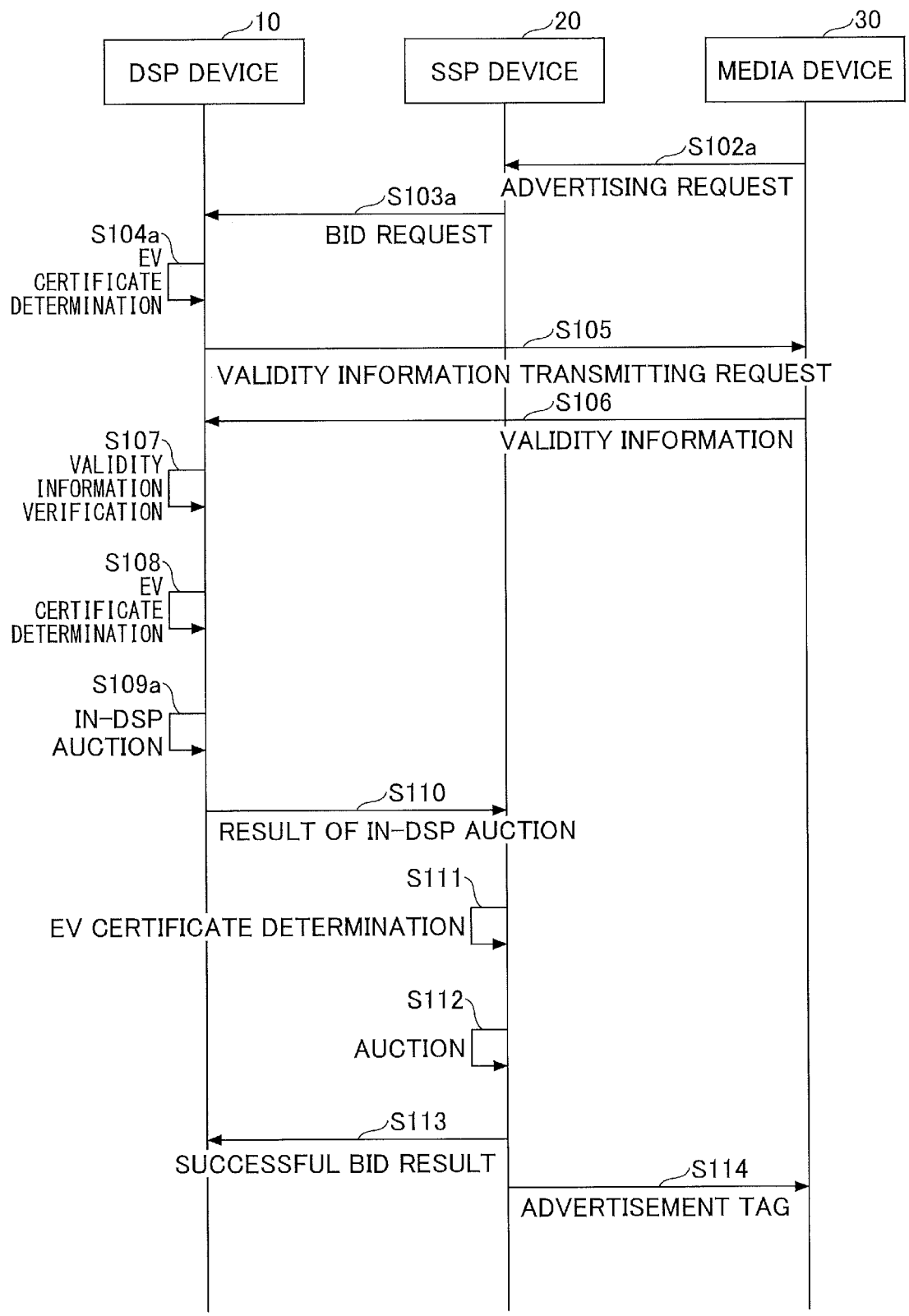
FIG. 9 is a sequence diagram for explaining an example of the processing procedure performed in the advertisement communication system according to the second embodiment.

FIG. 9 is a sequence diagram for explaining an example of the processing procedure performed by the advertisement communication system according to the second embodiment. In FIG. 9, the same steps as in FIG. 6 are designated by the same reference numerals, and a description thereof will be omitted.

As illustrated in FIG. 9, the second embodiment does not perform step S101. Accordingly, a digital signature is not attached to the advertising information. As a result, in step S102a, the signature unit 33 of the media device 30 transmits an advertising request, including the advertising information which does not have a digital signature attached thereto, to the SSP device 20. The receiving unit 21 of the SSP device 20 receives the advertising request including the advertising information which does not have a digital signature attached thereto.

Next, the transmitting unit 22 of the SSP device 20 transmits a bid request, including the advertising information included in the advertising request, to the DSP device 10 (S103a). The receiving unit 11 of the DSP device 10 receives the bid request including the advertising information included in the advertising request.

Next, the EV certificate determination unit 15 of the DSP device 10 determines whether or not the certificate of the SSP device 20 in the SSL communication of step S103a is the EV certificate (S104a). The determination result affects the in-DSP auction in step S109a. In other words, in step S109a, the auction unit 16 of each DSP device 10 performs the in-DSP auction in response to the bid request received in step S103, based on the determination result in step S104a and the determination result in step S108, and determines the advertising creative and the bid amount of the winner of the auction (step S109).

More particularly, if both or only one of the determination result in step S104a and the determination result in step S108 indicate that the certificate is not the EV certificate, the auction unit 16 may reduce the bid amount of the advertising creative of the winner of the in-DSP auction. By reducing the bid amount in this manner, it is possible to reduce the possibility of the winner being ultimately awarded the advertising spot in the auction performed in the SSP device 20. In addition, the auction unit 16 may increase a reduction range of the bid amount when both the determination result in step S104a and the determination result in step S108 indicate that the certificate is not the EV certificate, compared to when only one of the determination result in step S104a and the determination result in step S108 indicates that the certificate is not the EV certificate. This is because, in the latter case, the existence of the SSP device 20 is also not assured, and the validity or reliability of the bid request may be regarded as being in an even lower state.

As described above, according to the second embodiment, the effects similar to those obtainable in the first embodiment can be obtained. Further, in the second embodiment, the DSP device 10 determines whether or not the certificate of the SSP device 20 is the EV certificate, thereby enabling detection of an entity (SSP device 20) at the end of the communication and having a validity that is not verified. Accordingly, particularly when the policy which rejects the bid if the certificate is not the EV certificate is adopted in step S109 and step S112, it is possible to exclude fraudulent DSPs, fraudulent SSPs, and fraudulent media.

Each of the embodiments described above illustrates an example which evaluates the validity or reliability of the entity at the end of the communication, based on whether or not the certificate used for the SSL communication of the advertising transaction is the EV certificate. However, the evaluation of the validity of the entity at the end of the communication, based on whether or not the certificate used for the SSL communication is the EV certificate, may be applied to an agent-to-agent communication (communication between devices) of an Artificial Intelligence (AI), an Internet of Things (IoT), and the like. In this case, the receiving device, which is the communication device on the information receiving side, may include a determination unit which evaluates the validity of the transmitting device, based on whether or not the certificate of the transmitting device, which is the communication device on the information transmitting side, is the EV certificate, and the process performed by the receiving device after receiving the information may be varied according to the determination result of the determination unit.

In each of the embodiments described above, the DSP device 10 is an example of the first device. The media device 30 is an example of a second device. The SSP device 20 is an example of a third device. The EV certificate determination unit 15 is an example of a first determination unit. The auction unit 16 is an example of a first processing unit. The EV certificate determination unit 23 is an example of the second determination unit. The auction unit 24 is an example of a second processing unit.

Although the embodiments of the present invention are described above in detail, the present invention is not limited to specific embodiments, and various modifications and variations are possible within the scope of the subject matter of the present invention recited in the claims.

This application claims priority to Japanese Patent Application No. 2018-209834, filed Nov. 7, 2018, the entire contents of which are incorporated herein by reference.

DESCRIPTION OF THE REFERENCE NUMERALS

1 Advertisement communication system
10 DSP device
11 Receiving unit
12 Transmitting unit
13 Signature verification unit
14 Validity information verification unit
15 EV certificate determination unit 16 Auction unit
20 SSP device
21 Receiving unit
22 Transmitting unit
23 EV certificate determination unit
24 Auction unit
30 Media device
31 Receiving unit
32 Transmitting unit
33 Signature unit
100 Drive device
101 Recording medium
102 Auxiliary storage device
103 Memory device
104 CPU
105 Interface device
B Bus

The invention claimed is:

1. A communication system, comprising:
a processor; and
a memory storing computer-executable instructions that when executed by the processor cause the communication system to perform:
receiving, by a first device, information from a second device, wherein the first device includes a demand side platform device representing as an agent of a plurality of advertisers, and wherein the second device includes a supply side platform device and is configured to provide media having an advertising spot;
determining whether or not an electronic certificate of the second device includes an extended validation certificate in response to a bid request for an advertisement with respect to the advertising spot, wherein the electronic certificate is associated with a secure communication with the second device, and wherein the extended validation certificate is associated with verifying legitimacy and physical existence of an operator of the second device;
detecting, based on whether the electronic certificate of the second device includes the extended validation certificate, the second device as a fraudulent device; and
reducing, based on the detecting the second device as the fraudulent device according to the determining the extended validation certificate, a bidding amount associated with the bid request, causing reduction of a possibility of the operator of the second device being awarded of a bid associated with the bid request.

2. The communication system as claimed in claim 1, the computer-executable instructions when executed further cause the communication system to perform:
determining, by a second processor associated with a third device, whether or not a certificate of the first device, used in a secure communication related to a response from the first device with respect to the bid request, is the extended validation certificate, wherein the third device is configured to represent an agent of the media, wherein the third device includes a second storage device configured to store a second program executed by the second processor; and
reducing a rating associated with a possibility of the advertising spot being awarded to an advertiser associated with the first device when the electronic certificate of the first device is without the extended validation certificate.

3. The communication system as claimed in claim 2, wherein the determining further includes determining whether or not an electronic certificate of the third device, used for a transmission of the bid request from the third device, includes an extended validation certificate, and
wherein the reducing further includes reducing the possibility of the advertising spot being awarded to the plurality of advertisers when the certificate of the second device is without the extended validation certificate, or when the certificate of the third device is without the extended validation certificate.

4. The communication system as claimed in claim 1, the computer-executable instructions when executed further cause the communication system to perform:
determining content of the advertisement and a bid amount associated with a winner of an auction associated with the bid request.

5. The communication system as claimed in claim 1, the computer-executable instructions when executed further cause the communication system to perform:
increasing a range of reducing the bid amount when neither the bid request nor validation information includes the extended validation certificate as compared to when only the validation information includes the extended validation certificate.

6. A communication device comprising:
a processor configured to perform:
receiving, by a first device, information from a second device, wherein the first device includes a demand side platform device representing as an agent of a plurality of advertisers, and wherein the second device includes a supply side platform device and is configured to provide media having an advertising spot;
determining whether or not an electronic certificate of the second device includes an extended validation certificate in response to a bid request for an advertisement with respect to the advertising spot, wherein the electronic certificate is associated with a secure communication with the second device, and wherein the extended validation certificate is associated with verifying legitimacy and physical existence of an operator of the second device;
detecting, based on whether the electronic certificate of the second device includes the extended validation certificate, the second device as a fraudulent device; and
reducing, based on the detecting the second device as the fraudulent device according to the determining the extended validation certificate, a bidding amount associated with the bid request, causing reduction of a possibility of the operator of the second device being awarded of a bid associated with the bid request.

7. The communication device according to claim 6, the processor further configured to perform:
determining, by a second processor associated with a third device, whether or not a certificate of the first device, used in the secure communication related to a response from the first device with respect to the bid request, is the extended validation certificate, wherein the third device is configured to represent an agent of the media, and wherein the third device includes a second storage device configured to store a second program executed by the second processor; and
reducing a rating associated with a possibility of the advertising spot being awarded to an advertiser associated with the first device when the electronic certificate of the first device is without the extended validation certificate.

8. The communication device according to claim 7,
wherein the determining further includes determining whether or not an electronic certificate of the third device, used for a transmission of the bid request from the third device, includes an extended validation certificate, and
wherein the reducing further includes reducing the possibility of the advertising spot being awarded to the plurality of advertisers when the certificate of the second device is without the extended validation certificate, or when the certificate of the third device is without the extended validation certificate.

9. The communication device as claimed in claim 6, the processor further configured to perform:
determining content of the advertisement and a bid amount associated with a winner of an auction associated with the bid request.

10. The communication device as claimed in claim 6, the processor further configured to perform:
increasing a range of reducing the bid amount when neither the bid request nor validation information includes the extended validation certificate as compared to when only the validation information includes the extended validation certificate.

11. A computer-implemented method for communication, comprising:
receiving, by a first device, information from a second device, wherein the first device includes a demand side platform device representing as an agent of a plurality of advertisers, and wherein the second device includes a supply side platform device and is configured to provide media having an advertising spot;
determining, by the first device, whether or not an electronic certificate of the second device includes an extended validation certificate in response to a bid request for an advertisement with respect to the advertising spot, wherein the electronic certificate is associated with a secure communication with the second device, and wherein the extended validation certificate is associated with verifying legitimacy and physical existence of an operator of the second device;
detecting, by the first device, based on whether the electronic certificate of the second device includes the extended validation certificate, the second device as a fraudulent device; and
reducing, by the first device, based on the detecting the second device as the fraudulent device according to the determining the extended validation certificate, a bidding amount associated with the bid request, causing reduction of a possibility of the operator of the second device being awarded of a bid associated with the bid request.

12. The computer-implemented method according to claim 11, the method further comprising:
determining, by a second processor associated with a third device, whether or not a certificate of the first device, used in the secure communication related to a response from the first device with respect to the bid request, is the extended validation certificate, wherein the third device is configured to represent an agent of the media, wherein the third device includes a second storage device configured to store a second program executed by the second processor; and
reducing a rating associated with a possibility of the advertising spot being awarded to an advertiser associated with the first device when the electronic certificate of the first device is without the extended validation certificate.

13. The computer-implemented method according to claim 12,
wherein the determining further includes determining whether or not an electronic certificate of the third device, used for a transmission of the bid request from the third device, includes an extended validation certificate, and
wherein the reducing further includes reducing the possibility of the advertising spot being awarded to the plurality of advertisers when the certificate of the second device is without the extended validation certificate, or when the certificate of the third device is without the extended validation certificate.

14. The computer-implemented method according to claim 11, the method further comprising:
determining content of the advertisement and a bid amount associated with a winner of an auction associated with the bid request.

15. The computer-implemented method according to claim 11, the method further comprising:
increasing a range of reducing the bid amount when neither the bid request nor validation information includes the extended validation certificate as compared to when only the validation information includes the extended validation certificate.

16. A non-transitory computer-readable storage medium storing computer-executable instructions that when executed by a processor cause a computer system to perform:
receiving, by a first device, information from a second device, wherein the first device includes a demand side platform device representing as an agent of a plurality of advertisers, and wherein the second device includes a supply side platform device and is configured to provide media having an advertising spot;
determining, by the first device, whether or not an electronic certificate of the second device includes an extended validation certificate in response to a bid request for an advertisement with respect to the advertising spot, wherein the electronic certificate is associated with a secure communication with the second device, and wherein the extended validation certificate is associated with verifying legitimacy and physical existence of an operator of the second device;
detecting, by the first device, based on whether the electronic certificate of the second device includes the extended validation certificate, the second device as a fraudulent device; and
reducing, by the first device, based on the detecting the second device as the fraudulent device according to the determining the extended validation certificate, a bidding amount associated with the bid request, causing reduction of possibility of the operator of the second device being awarded of a bid associated with the bid request.

17. The non-transitory computer-readable storage medium according to claim 16, the computer-executable instructions when executed further causing the computer system to perform:
causing determination of, by a third device representing an agent of media, whether or not a certificate of the first device, used in a secure communication related to a response from the first device with respect to the bid request, is the extended validation certificate; and causing reduction of a rating associated with a possibility of the advertising spot being awarded to an advertiser associated with the first device when the electronic certificate of the first device is without the extended validation certificate.

18. The non-transitory computer-readable storage medium according to claim 17,
wherein the causing determination further includes determining whether or not an electronic certificate of the third device, used for a transmission of the bid request from the third device, includes an extended validation certificate, and
wherein the causing reduction further includes reducing the possibility of the advertising spot being awarded to the plurality of advertisers when the certificate of the second device is without the extended validation certificate, or when the certificate of the third device is without the extended validation certificate.

19. The non-transitory computer-readable storage medium according to claim 16, the computer-executable instructions when executed further causing the computer system to perform:
determining content of the advertisement and a bid amount associated with a winner of an auction associated with the bid request.

20. The non-transitory computer-readable storage medium according to claim 16, the computer-executable instructions when executed further causing the computer system to perform:
increasing, by the first device, a range of reducing the bid amount when neither the bid request nor validation information includes the extended validation certificate as compared to when only the validation information includes the extended validation certificate.

\* \* \* \* \*